US010422377B2

(12) United States Patent
 Hosaka et al.

(10) Patent No.: US 10,422,377 B2
(45) Date of Patent: Sep. 24, 2019

(54) ROLLING DEVICE AND METHOD FOR MANUFACTURING ROLLING DEVICE

(71) Applicant: THK CO., LTD., Tokyo (JP)

(72) Inventors: Eiji Hosaka, Tokyo (JP); Hiroomi Kuribayashi, Tokyo (JP)

(73) Assignee: THK CO., LTD., Tokyo (JP)

( * ) Notice: Subject to any disclaimer, the term of this patent is extended or adjusted under 35 U.S.C. 154(b) by 0 days.

(21) Appl. No.: 15/316,013

(22) PCT Filed: Jun. 1, 2015

(86) PCT No.: PCT/JP2015/002749
§ 371 (c)(1),
(2) Date: Dec. 2, 2016

(87) PCT Pub. No.: WO2015/186336
PCT Pub. Date: Dec. 10, 2015

(65) Prior Publication Data
US 2017/0097042 A1   Apr. 6, 2017

(30) Foreign Application Priority Data
Jun. 3, 2014   (JP) ................ 2014-114716

(51) Int. Cl.
 *F16C 29/06*   (2006.01)
 *F16C 33/66*   (2006.01)
 (Continued)

(52) U.S. Cl.
 CPC ........ *F16C 29/0647* (2013.01); *F16C 29/005* (2013.01); *F16C 29/0602* (2013.01);
 (Continued)

(58) Field of Classification Search
 CPC .... F16C 29/04; F16C 29/0602; F16C 29/063; F16C 29/0633; F16C 29/0669;
 (Continued)

(56) References Cited

U.S. PATENT DOCUMENTS 4,656,881 A * 4/1987 Goedecke ............ F15B 15/084
 384/55
4,941,197 A * 7/1990 Roeser .................... B63H 9/10
 384/15

(Continued)

FOREIGN PATENT DOCUMENTS

DE       3629368 A1    3/1988
JP       63-37817 U    3/1988
 (Continued)

OTHER PUBLICATIONS

Machine Translation of JP 2000-024984 (Year: 2000).*
 (Continued)

*Primary Examiner* — Alan B Waits
(74) *Attorney, Agent, or Firm* — Westerman, Hattori, Daniels & Adrian, LLP

(57) ABSTRACT

A rolling device includes: an inner member that has a raceway face; an outer member that has a raceway face facing the raceway face; and rolling elements that are disposed between both raceway faces in a rollable manner, wherein at least one of the inner member and the outer member has a space formed therein. Further, a method for manufacturing a rolling device including an inner member that has a raceway face, an outer member that has a raceway face facing the raceway face, rolling elements that are disposed between both raceway faces in a rollable manner, and a space that is formed inside at least one of the inner member and the outer member by a 3D printer.

3 Claims, 24 Drawing Sheets

(51) Int. Cl.
| | |
|---|---|
| *F16C 29/12* | (2006.01) |
| *F16H 57/04* | (2010.01) |
| *F16H 57/12* | (2006.01) |
| *F16H 25/22* | (2006.01) |
| *F16C 29/00* | (2006.01) |
| *F16C 33/64* | (2006.01) |
| *B33Y 10/00* | (2015.01) |
| *B33Y 80/00* | (2015.01) |
| *F16C 19/36* | (2006.01) |
| *F16C 33/60* | (2006.01) |

(52) U.S. Cl.
CPC ........ *F16C 29/0611* (2013.01); *F16C 29/123* (2013.01); *F16C 33/64* (2013.01); *F16C 33/6659* (2013.01); *F16H 25/2204* (2013.01); *F16H 25/2214* (2013.01); *F16H 25/2233* (2013.01); *F16H 25/2238* (2013.01); *F16H 57/0497* (2013.01); *F16H 57/12* (2013.01); *B33Y 10/00* (2014.12); *B33Y 80/00* (2014.12); *F16C 19/362* (2013.01); *F16C 29/002* (2013.01); *F16C 29/063* (2013.01); *F16C 29/064* (2013.01); *F16C 29/0642* (2013.01); *F16C 29/0695* (2013.01); *F16C 33/60* (2013.01); *F16C 33/664* (2013.01); *F16C 2220/00* (2013.01); *F16C 2220/06* (2013.01)

(58) Field of Classification Search
CPC .... F16C 29/002; F16C 29/005; F16C 29/123; F16C 29/0611; F16C 29/0695; F16C 33/60; F16C 33/64; F16C 33/664; F16C 33/6659; F16C 19/362; F16C 2220/00; F16C 2220/06; F16H 25/2204; F16H 25/2214; F16H 25/2233; F16H 25/2238; F16H 57/0497
See application file for complete search history.

(56) References Cited

U.S. PATENT DOCUMENTS

| | | | |
|---|---|---|---|
| 5,971,614 A * | 10/1999 | Kane | F16C 29/025 384/12 |
| 6,227,708 B1 | 5/2001 | Rixen et al. | |
| 6,250,804 B1 * | 6/2001 | Hsu | F16C 33/6651 384/13 |
| 7,465,095 B2 * | 12/2008 | Agari | F16C 29/0611 384/13 |
| 7,845,854 B2 * | 12/2010 | Shirai | F16C 29/005 384/43 |
| 9,108,280 B2 * | 8/2015 | Wang | F16C 29/02 |
| 2006/0002637 A1 * | 1/2006 | Bauer | F16C 29/005 384/55 |
| 2014/0177984 A1 * | 6/2014 | Wang | F16C 29/02 384/42 |

FOREIGN PATENT DOCUMENTS

| | | |
|---|---|---|
| JP | 63-162133 A | 7/1988 |
| JP | 3-41212 A | 2/1991 |
| JP | 2000-24984 A | 1/2000 |
| JP | 3066116 U | 2/2000 |
| JP | 2002-106558 A | 4/2002 |
| JP | 2003-202019 A | 7/2003 |
| JP | 2006-17305 A | 1/2006 |
| JP | 2007-24305 A | 2/2007 |

OTHER PUBLICATIONS

Machine Translation of JP 2002-106558 (Year: 2002).*
Website: "http://www.3dprinterworld.com/article/stronger-than-steel-lighter-than-water-3d-printed-micro-trusses" by Tod Halterman dated Feb. 11, 2014 (Year: 2014).*
International Search Report dated Aug. 11, 2015, issued in counterpart application No. PCT/JP2015/002749. (2 pages).
Office Action dated Jun. 19, 2018, issued in counterpart Japanese Application No. 2014-114716, with English machine translation. (11 pages).

* cited by examiner (a)

(b)

(a)

(b)

ROLLING DEVICE AND METHOD FOR MANUFACTURING ROLLING DEVICE

TECHNICAL FIELD

The present invention relates to a rolling device structure and method for manufacturing a rolling device.

BACKGROUND ART

A rolling device includes an inner member that has a raceway face formed on an outer face and an outer member that has a raceway face facing the raceway face of the inner member and is disposed at the outside of the inner member. A plurality of rolling elements are interposed between the inner member and the outer member and thus the outer member is movable relatively to the inner member. A basic configuration of such a rolling device is disclosed in, for example, Patent Literature 1 below and the like. Patent Literature 1 below discloses a configuration in which a movement block serving as an inner member is movable along a guide rail serving as an outer member fixed to a fixing portion.

Since the rolling device disclosed in Patent Literature 1 below has a plurality of rolling elements interposed between the inner member and the outer member, a quick movement can be obtained. Accordingly, the rolling device is used in various fields of a robot, a machine tool, a medical instrument, and aircraft equipment. Then, a decrease in weight of the rolling device is attempted in order to use the rolling device in various fields. In recent years, as a countermeasure for decreasing the weight of the rolling device, the rolling device is cut to realize thinning and a decrease in thickness of the rolling device or perforating. Further, as a material forming the rolling device, for example, a titanium material is used.

CITATION LIST

Patent Literature

Patent Literature 1: JP 2003-202019 A

DISCLOSURE OF THE INVENTION

Problems to be Solved by the Invention

However, there is a problem in which a remarkable decrease in weight of the rolling device cannot be realized even when a cutting process is performed on the rolling device. Further, since a material forming the rolling device may be determined in accordance with the use application or the use environment of the rolling device, a case may arise in that a material forming the rolling device is not easily changed when a decrease in weight of the rolling device needs to be realized.

The invention is made in view of the above-described circumstances and an object of the invention is to provide a conventionally unattainable rolling device and method for manufacturing a rolling device capable of realizing a remarkable decrease in weight.

Means for Solving the Problems

A rolling device according to the present invention includes: an inner member that has a raceway face formed on an outer face; an outer member that has a raceway face facing the raceway face of the inner member and is disposed at the outside of the inner member; and rolling elements that are disposed between both raceway faces in a rollable manner, wherein at least one of the inner member and the outer member has a space formed therein.

Furthermore, in a method for manufacturing a rolling device by a 3D printer according to the present invention, the rolling device includes an inner member that has a raceway face formed on an outer face, an outer member that has a raceway face facing the raceway face of the inner member and is disposed at the outside of the inner member, rolling elements that are disposed between both raceway faces in a rollable manner, and a space that is formed inside at least one of the inner member and the outer member.

Effects of the Invention

According to the invention, it is possible to provide a conventionally unattainable rolling device and method for manufacturing a rolling device capable of realizing a remarkable decrease in weight.

BRIEF DESCRIPTION OF DRAWINGS

FIG. 12(a) is an external front view illustrating the track rail according to the example, FIG. 12(b) is an external side view illustrating the track rail according to the example, FIG. 12(c) is an external top view illustrating the track rail according to the example, and FIG. 12(d) is an external bottom view illustrating the track rail according to the example.

FIG. 16(a) is an external front view illustrating the movement block according to the example, FIG. 16(b) is an external side view illustrating the movement block according to the example, FIG. 16(c) is an external top view illustrating the movement block according to the example, and FIG. 16(d) is an external bottom view illustrating the movement block according to the example.

FIG. 17(a) is a top perspective view illustrating the movement block according to the example and FIG. 17(b) is a bottom perspective view illustrating the movement block according to the example.

MODE FOR CARRYING OUT THE INVENTION

Hereinafter, preferred embodiments of the invention will be described with reference to the drawings. Further, the embodiments below do not limit the invention according to claims. Further, all combinations of characteristics described in the embodiments are not essential for solving means of the invention.

[First Embodiment]

Figure 1:
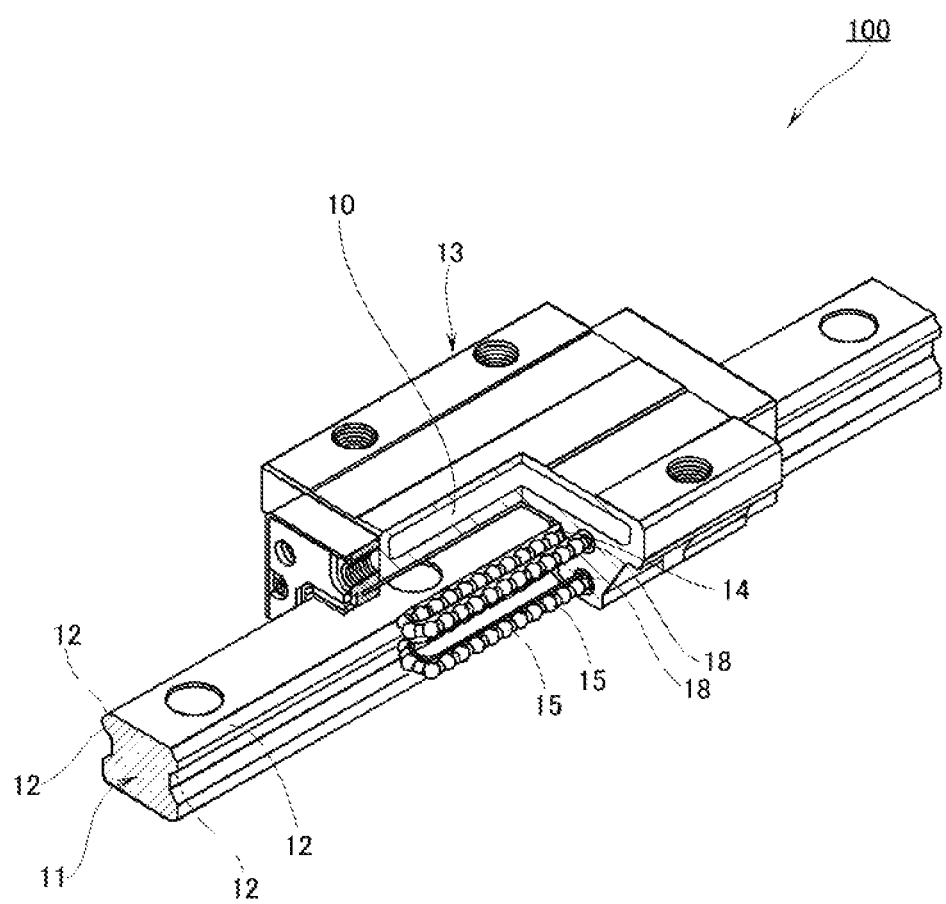
FIG. 1 is a partially cutaway perspective external view illustrating a configuration example of a rolling device according to a first embodiment.
Figure 2:
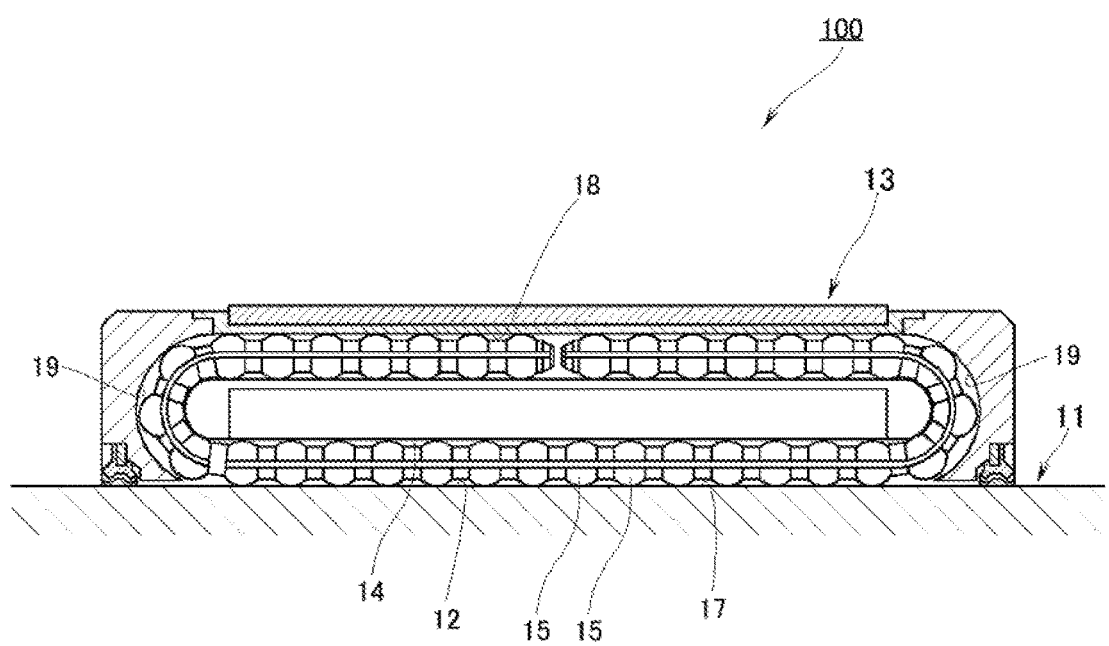
FIG. 2 is a longitudinal sectional view illustrating an internal configuration of the rolling device illustrated in FIG. 1.
Figure 3:
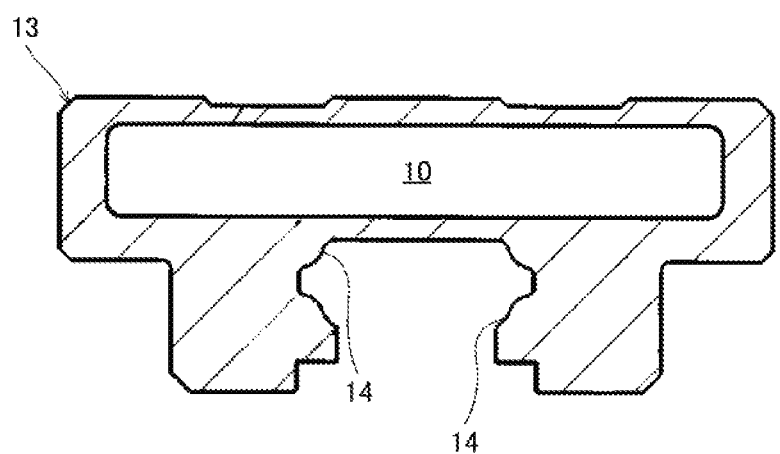
FIG. 3 is a schematic diagram illustrating a configuration example of an outer member according to the first embodiment.
Figure 4:
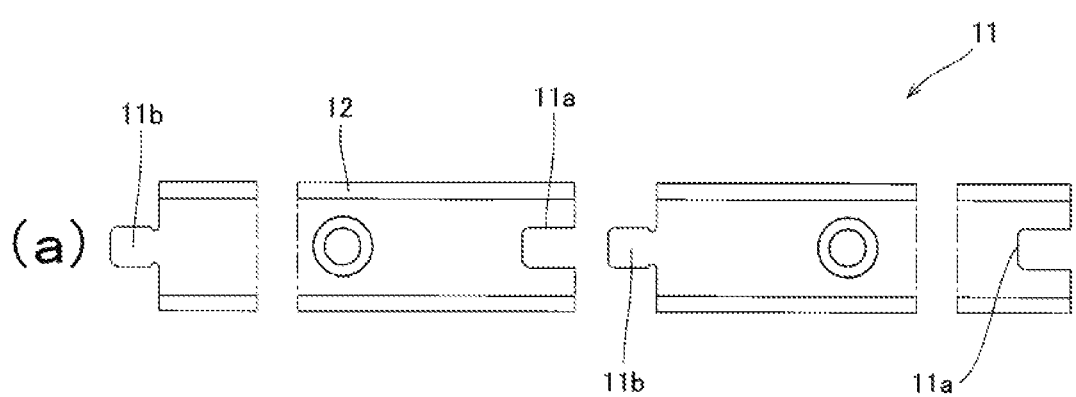
FIGS. 4(a) and 4(b) are schematic diagrams illustrating a configuration example of an inner member according to the first embodiment.
Figure 4:
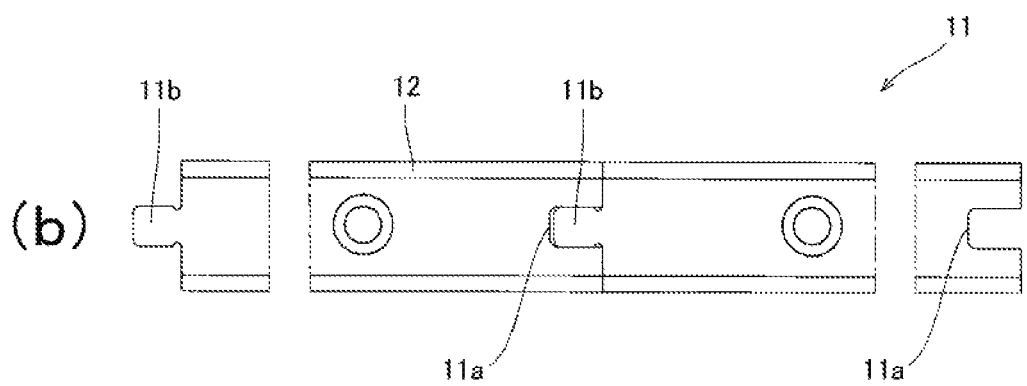

First, a configuration example of a rolling device 100 according to a first embodiment will be described with reference to FIGS. 1 to 4(b). Here, FIG. 1 is a partially cutaway perspective external view illustrating a configuration example of a rolling device according to the first embodiment and FIG. 2 is a longitudinal sectional view illustrating an internal configuration of the rolling device illustrated in FIG. 1. Further, FIG. 3 is a schematic diagram illustrating a configuration example of an outer member according to the first embodiment and FIGS. 4(a) and 4(b) are schematic diagrams illustrating a configuration example of an inner member according to the first embodiment.

The rolling device 100 according to the first embodiment includes a track rail 11 which serves as an inner member having a raceway face formed on an outer face, a movement block 13 which serves as an outer member having a raceway face facing the raceway face of the inner member and is disposed at the outside of the inner member, and balls 15 which serve as rolling elements disposed between both raceway faces in a rollable manner.

The track rail 11 is an elongated member that has a substantially rectangular shape in a cross-section orthogonal to the longitudinal direction and the surface thereof is provided with a rolling element rolling face 12 which is formed in the entire length of the track rail 11 to serve as a raceway face on which the balls 15 roll. Here, the track rail 11 may extend along a straight line or a curve. Further, a pair of the rolling element rolling faces 12 exemplified in FIGS. 1 to 4(b) is provided at each of the left and right sides so that four rolling element rolling faces are provided in total, but the number of the rolling element rolling faces can be changed arbitrarily in response to the application purpose of the rolling device 100.

Meanwhile, the movement block 13 is provided with a load rolling element rolling face 14 which is provided at a position corresponding to the rolling element rolling face 12 of the track rail 11 so that the balls 15 roll on the raceway face. A load rolling element rolling path 17 is formed by the rolling element rolling face 12 of the track rail 11 and the load rolling element rolling face 14 of the movement block 13 and a plurality of the balls 15 are interposed therebetween while receiving a load. Further, the movement block 13 is provided with a non-load rolling element rolling path 18 which extends in parallel to the load rolling element rolling path 17 while being separated therefrom by a predetermined gap and a direction change path 19 which connects the load rolling element rolling path 17 and the non-load rolling element rolling path 18 to each other. One endless circulation path is formed by a combination of the load rolling element rolling path 17, the non-load rolling element rolling path 18, and a pair of the direction change paths 19 and 19 connecting two rolling paths to each other. Then, when the plurality of the balls 15 are installed on the endless circulation path formed by the load rolling element rolling path 17, the non-load rolling element rolling path 18, and the pair of direction change paths 19 and 19 to be circulated endlessly, the movement block 13 is relatively movable in a reciprocating manner with respect to the track rail 11.

Then, in the rolling device 100 according to the first embodiment, at least one of the track rail 11 serving as the inner member and the movement block 13 serving as the outer member has a space 10 therein. Further, in the first embodiment, a description will be made on the assumption that the space 10 is formed inside the movement block 13 serving as the outer member.

The space 10 according to the first embodiment can be provided at an arbitrary position of the rolling device 100 other than a portion relatively moving the movement block 13 with respect to the track rail 11 in a reciprocating manner. Here, a portion relatively moving the movement block 13 with respect to the track rail 11 (a portion exhibiting the function of the rolling device 100) indicates, for example, the endless circulation path formed by the load rolling element rolling path 17 and the non-load rolling element rolling path 18 on which the plurality of the balls 15 roll and the pair of direction change paths 19 and 19 which connect two rolling paths to each other. In this way, when the space 10 is formed inside the track rail 11 serving as the inner member or the movement block 13 serving as the outer member, the rolling device 100 according to the first embodiment can realize a remarkable decrease in weight while keeping the function of the rolling device 100.

Further, a spatial strength keeping mechanism 20 which keeps strength of the inner member or the outer member can be formed inside the space 10. Additionally, the spatial strength keeping mechanism 20 will be described in detail by the embodiment to be described below. However, for example, a truss structure, a frame structure, or a honeycomb structure can be employed. The truss structure means a structure in which all nodes are connected in a slidable or rotatable manner and generally corresponds to a triangle connection structure. The frame structure means a structure in which all nodes are rigidly connected in a non-deformable manner and generally corresponds to a rectangular connection structure. Further, the honeycomb structure means a structure in which a honeycomb core material is interposed between two plate-shaped hulls and generally corresponds to a hexagonal connection structure.

As described above, in the rolling device 100 according to the first embodiment, at least one of the track rail 11 serving as the inner member and the movement block 13 serving as the outer member has the space 10 formed therein and the spatial strength keeping mechanism 20 is formed inside the space 10. Accordingly, the rolling device 100 can be decreased in weight while the strength thereof is kept. Further, when a portion exhibiting the function of the rolling device 100 is formed thickly and the space 10 is formed in a portion other than the portion exhibiting the function, a remarkable decrease in weight can be realized while the function of the rolling device 100 is kept. Thus, in the rolling device 100 according to the first embodiment, the amount of a material forming the rolling device 100 can be decreased and thus the rolling device 100 can be manufactured at low cost. Further, in the rolling device 100 according to the first embodiment, for example, even when a titanium material which is an expensive material is used as a material forming the rolling device 100, the amount of the material forming the rolling device can be decreased compared with the related art and thus an increase in cost can be suppressed. Further, the rolling device 100 according to the first embodiment is used in, for example, various fields of an airplane which needs to be decreased in weight or a consumer product which needs to be provided at low cost.

Additionally, regarding the inner member of the rolling device 100 according to the first embodiment, as illustrated in FIG. 4(a), a concave portion 11a or a convex portion 11b can be formed at the ends of the track rails 11 serving as a plurality of the inner members. As illustrated in FIG. 4(b), when the concave portion 11a and the convex portion 11b are fitted to each other, a plurality of the track rails 11 can be simply and accurately connected to each other. With such a configuration, the track rail 11 can be easily positioned and thus the rolling device 100 can be easily and promptly assembled.

Figure 5:
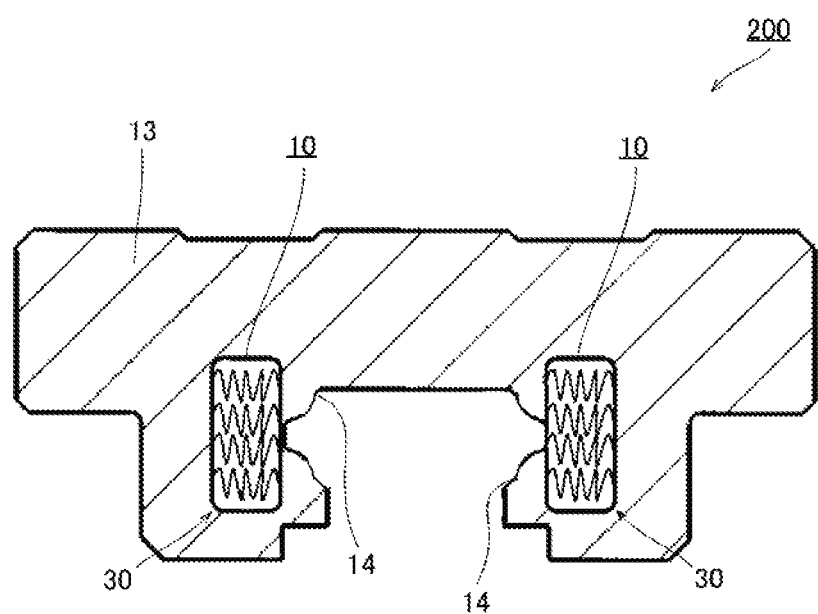
FIG. 5 is a schematic longitudinal sectional view illustrating a configuration example of an outer member according to a second embodiment.

As described above, a configuration example of the rolling device 100 according to the first embodiment has been described. Next, a configuration example of a rolling device 200 according to a second embodiment will be described with reference to FIG. 5. Here, FIG. 5 is a schematic diagram illustrating a configuration example of an outer member according to the second embodiment. Additionally, there is a case in which the same reference numerals are given to the same or similar components as or to those of the above-described embodiment and a description thereof is omitted.

[Second Embodiment]

The rolling device 200 according to the second embodiment includes a track rail 11 which serves as an inner member having a raceway face formed on an outer face, a movement block 13 which serves as an outer member having a raceway face facing the raceway face of the inner member and is disposed at the outside of the inner member, balls 15 which serve as rolling elements disposed between both raceway faces in a rollable manner, a space 10 which is formed inside at least one of the track rail 11 serving as the inner member and the movement block 13 serving as the outer member, and an external force absorbing mechanism 30 which has a telescopic structure.

The space 10 is formed in at least one of the track rail 11 serving as the inner member and the movement block 13 serving as the outer member and is disposed in the vicinity of, for example, the rolling element rolling face 12 or the load rolling element rolling face 14 serving as the raceway face. Then, an external force absorbing mechanism 30 having a telescopic structure is formed inside the space 10.

The external force absorbing mechanism 30 according to the second embodiment can be formed as a telescopic structure which is similar to a spring shape inside the space 10 and is disposed in the vicinity of, for example, the rolling element rolling face 12 or the load rolling element rolling face 14 serving as the raceway face. Since the external force absorbing mechanism 30 is formed as a telescopic structure having a spring shape, the external force absorbing mechanism 30 can absorb an external force applied to the raceway face by the displacement of the inner member or the outer member caused by a load in a certain direction while having rigidity with respect to a load in a certain direction. More specifically, the external force absorbing mechanism 30 can absorb an external force applied to the raceway face by the displacement of the inner member or the outer member in a condition that a direction of an elastic force of a spring matches a direction of the external force applied to the raceway face. That is, the external force absorbing mechanism 30 is formed to have an elastic direction which matches at least a direction of a component force of the external force in the external force applied to the raceway face.

For example, as illustrated in FIG. 5, when the external force absorbing mechanism 30 formed inside the space 10 is formed in the movement block 13 serving as the outer member, an external force applied from the track rail 11 serving as the inner member to the load rolling element rolling face 14 of the movement block 13 can be appropriately absorbed. Thus, in the rolling device 200 according to the second embodiment, a displacement amount caused by the attachment error of the track rail 11 or the waviness of the attachment face of the track rail 11 can be absorbed. Further, for example, even when the track rail 11 serving as the inner member is provided with the external force absorbing mechanism 30, an external force applied from the movement block 13 serving as the outer member to the rolling element rolling face 12 of the track rail 11 can be appropriately absorbed by the external force absorbing mechanism 30 similarly to the above-described case. Additionally, it is desirable to appropriately dispose a spring in response to a use condition of the rolling device in the external force absorbing mechanism 30 formed as a telescopic structure having a spring shape. For example, an elastic force absorbing direction is set to a direction perpendicular to the ball 15 and the raceway face so that the external force applied to the rolling element rolling face 12 or the load rolling element rolling face 14 serving as the raceway face can be appropriately absorbed through the balls 15 serving as the rolling elements. Further, the telescopic structure according to the second embodiment is not limited to the spring shape and the telescopic structure according to the invention may be formed in any shape as long as the same operation and effect as those of the spring shape can be exhibited.

Incidentally, in the rolling device of the related art, for example, even when the rolling device is used in a field of a consumer product that does not need a high-performance rolling device, the processing accuracy of the attachment face of the rolling device needs to be high, the attachment error of the rolling device needs to be suppressed to minimum, or the rolling device needs to be attached with a careful attention. As a result, a case arises in that the performance of the rolling device necessary for the use application of the rolling device does not match the actual performance of the rolling device in the use application.

With regard to the above-described problem, in the rolling device 200 according to the embodiment, the external force based on the attachment error and the like can be appropriately absorbed by the external force absorbing mechanism 30 and the attachment accuracy can be ensured even when the attachment face or the attachment method of the rolling device 200 is rough. Accordingly, the movement block 13 is relatively movable with respect to the track rail 11. Thus, in the rolling device 200 according to the embodiment, the rolling device 200 can be used in, for example, fields of a consumer product, an airplane, and an automobile in which the attachment face or the attachment method of the rolling device 200 needs rough accuracy.

Figure 6:
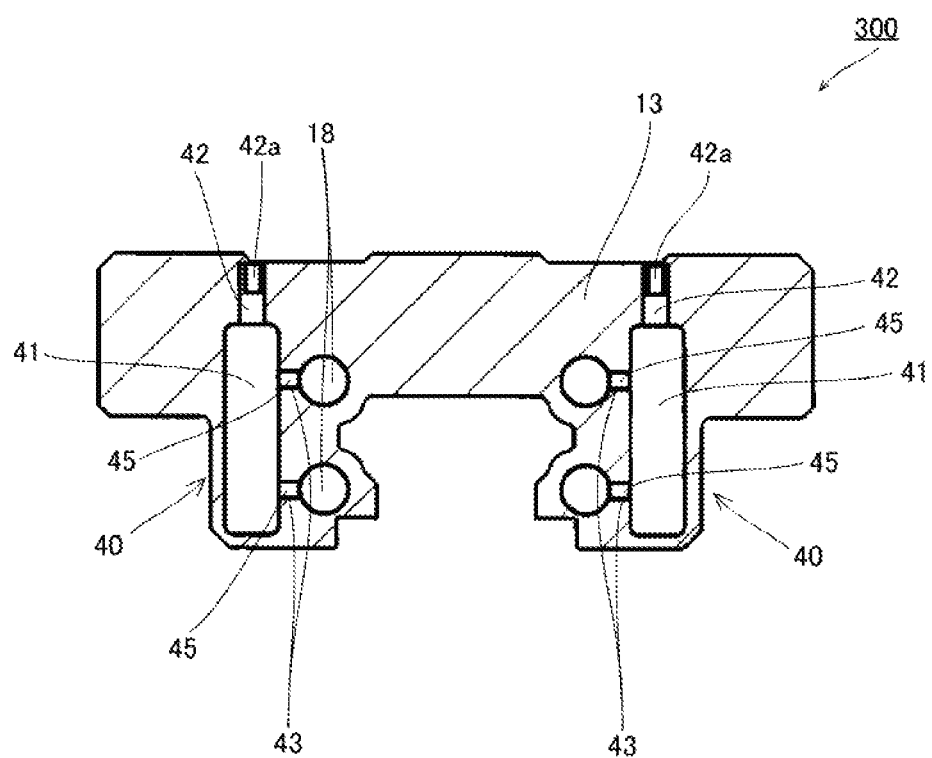
FIG. 6 is a schematic diagram illustrating a configuration example of an outer member according to a third embodiment.

As described above, a configuration example of the rolling device 200 according to the second embodiment has been described. Next, a configuration example of a rolling device 300 according to a third embodiment will be described with reference to FIG. 6. Here, FIG. 6 is a schematic diagram illustrating a configuration example of an outer member according to the third embodiment. Additionally, there is a case in which the same reference numerals are given to the same or similar components as or to those of the above-described embodiments and a description thereof is omitted.

[Third Embodiment]

The rolling device 300 according to the third embodiment includes a track rail 11 which serves as an inner member having a raceway face formed on an outer face, a movement block 13 which serves as an outer member having a raceway face facing the raceway face of the inner member and is disposed at the outside of the inner member, balls 15 which serve as rolling elements disposed between both raceway faces in a rollable manner, a space 10 which is formed inside at least one of the track rail 11 serving as the inner member and the movement block 13 serving as the outer member, and a lubricant supply mechanism 40 which supplies lubricant to the balls 15 serving as the rolling elements.

The space 10 is formed in at least one of the track rail 11 serving as the inner member and the movement block 13 serving as the outer member and is disposed inside the movement block 13 serving as the outer member, for example, as illustrated in FIG. 6. Then, the lubricant supply mechanism 40 which supplies lubricant to the balls 15 serving as the rolling elements is formed inside the space 10.

The lubricant supply mechanism 40 according to the third embodiment includes a lubricant storage space 41 which holds lubricant and a small-diameter hole 43.

The lubricant storage space 41 is a space which stores lubricant. As illustrated in FIG. 6, for example, the lubricant storage space 41 can be disposed at the outside of the movement block 13 of a non-load rolling element rolling path 18 in the width direction inside the movement block 13. The volume of the lubricant storage space 41 is set to be larger than the volume of the non-load rolling element rolling path 18. With such a configuration, in the rolling device 300 according to the embodiment, the frequency of the maintenance of the rolling device 300 can be decreased.

Further, as illustrated in FIG. 6, for example, a lubricant replenishing hole 42 for replenishing lubricant can be formed above the lubricant storage space 41. A user of the rolling device 300 according to the embodiment can replenish the lubricant from the lubricant replenishing hole 42 and stop an opening of the lubricant replenishing hole 42 by, for example, a stopper 42a or the like.

The small-diameter hole 43 is used to connect the lubricant storage space 41 and the non-load rolling element rolling path 18 to each other. For example, a lubricant containing body 45 such as a felt which contain lubricant can be filled inside the small-diameter hole 43.

When the small-diameter hole 43 is connected to the lubricant storage space 41 which contains the lubricant, the lubricant flows into the small-diameter hole 43 by a capillary phenomenon and the lubricant permeates into the lubricant containing body 45 filled inside the small-diameter hole 43. Then, the lubricant which permeates into the lubricant containing body 45 is supplied to the raceway face or the balls 15 serving as the rolling elements rolling on the non-load rolling element rolling path 18.

In the rolling device of the related art, for example, grease is periodically supplied from a grease gun to the rolling device or a lubricating device supplying lubricant to the rolling element or the raceway face is provided at the end of the movement block 13 in the longitudinal direction to supply the lubricant to the rolling element or the raceway face. Thus, an installation space for the grease gun or the lubricating device is needed. As a result, a case arises in that the entire length of the movement block 13 increases.

However, since the lubricant supply mechanism 40 is provided inside the movement block 13 in the rolling device 300 according to the third embodiment, the rolling device 300 according to the third embodiment can be decreased in weight and size and the rolling device 300 does not need maintenance for a long period of time.

Figure 7:
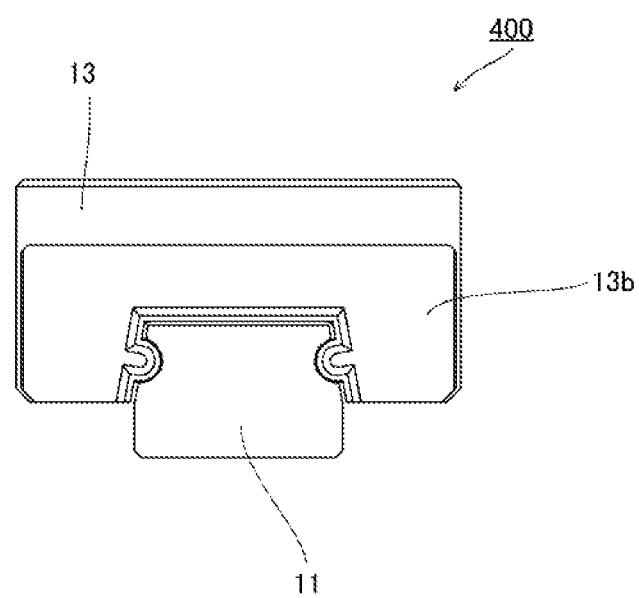
FIG. 7 is an external front view illustrating a rolling device according to the example.
Figure 8:
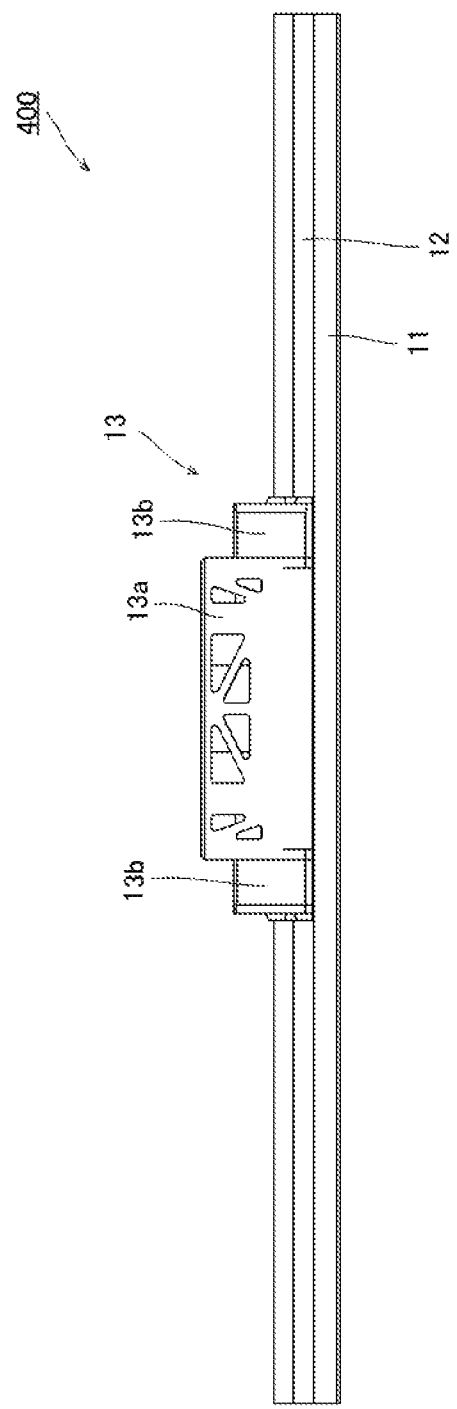
FIG. 8 is an external side view illustrating the rolling device according to the example.
Figure 9:
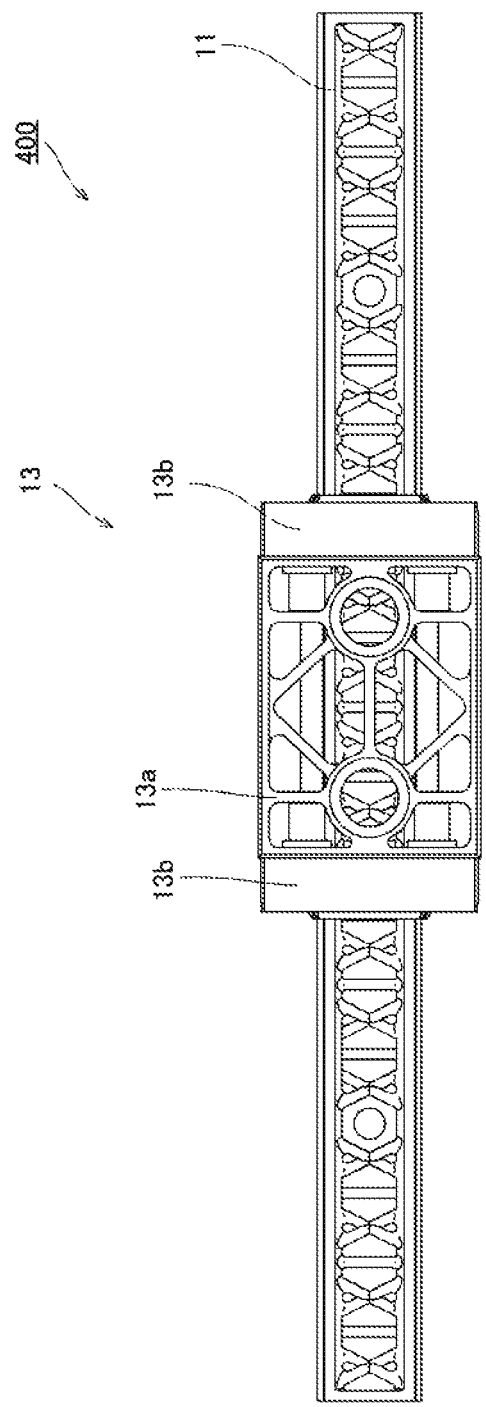
FIG. 9 is an external top view illustrating the rolling device according to the example.
Figure 10:
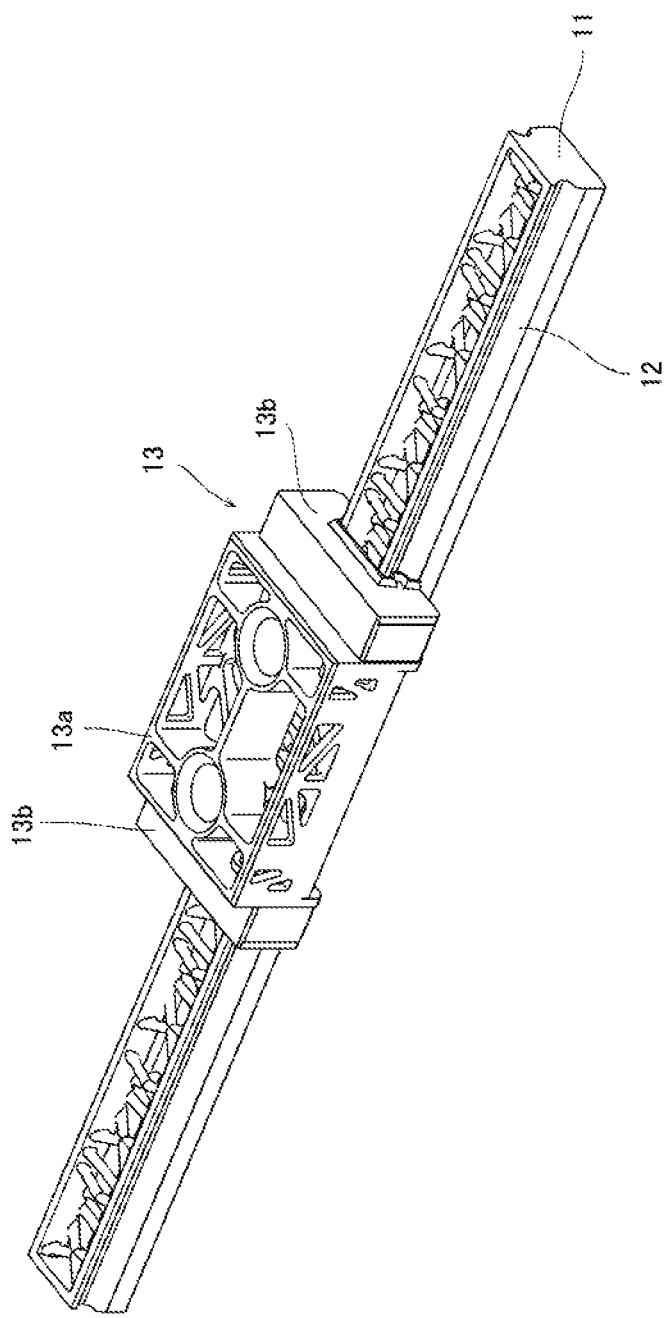
FIG. 10 is an external perspective view illustrating the rolling device according to the example.
Figure 11:
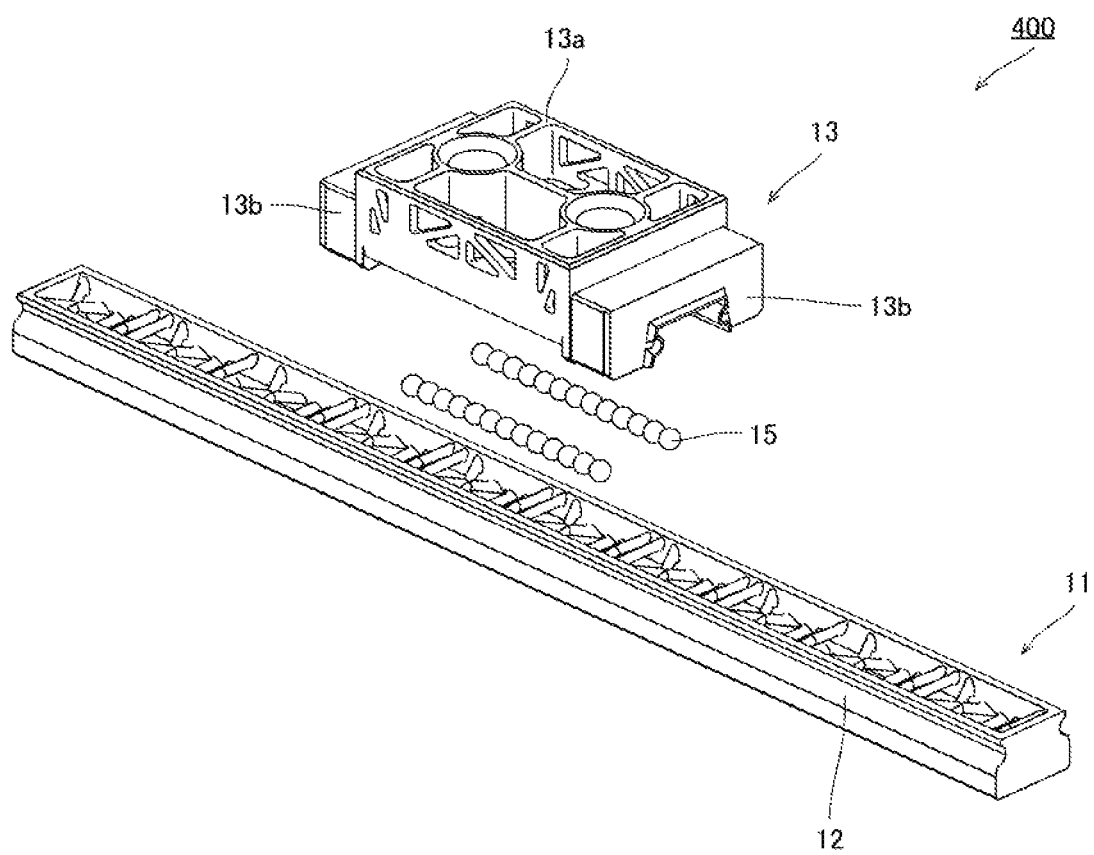
FIG. 11 is an exploded diagram illustrating a state where the rolling device according to the example is disassembled.
Figure 12:
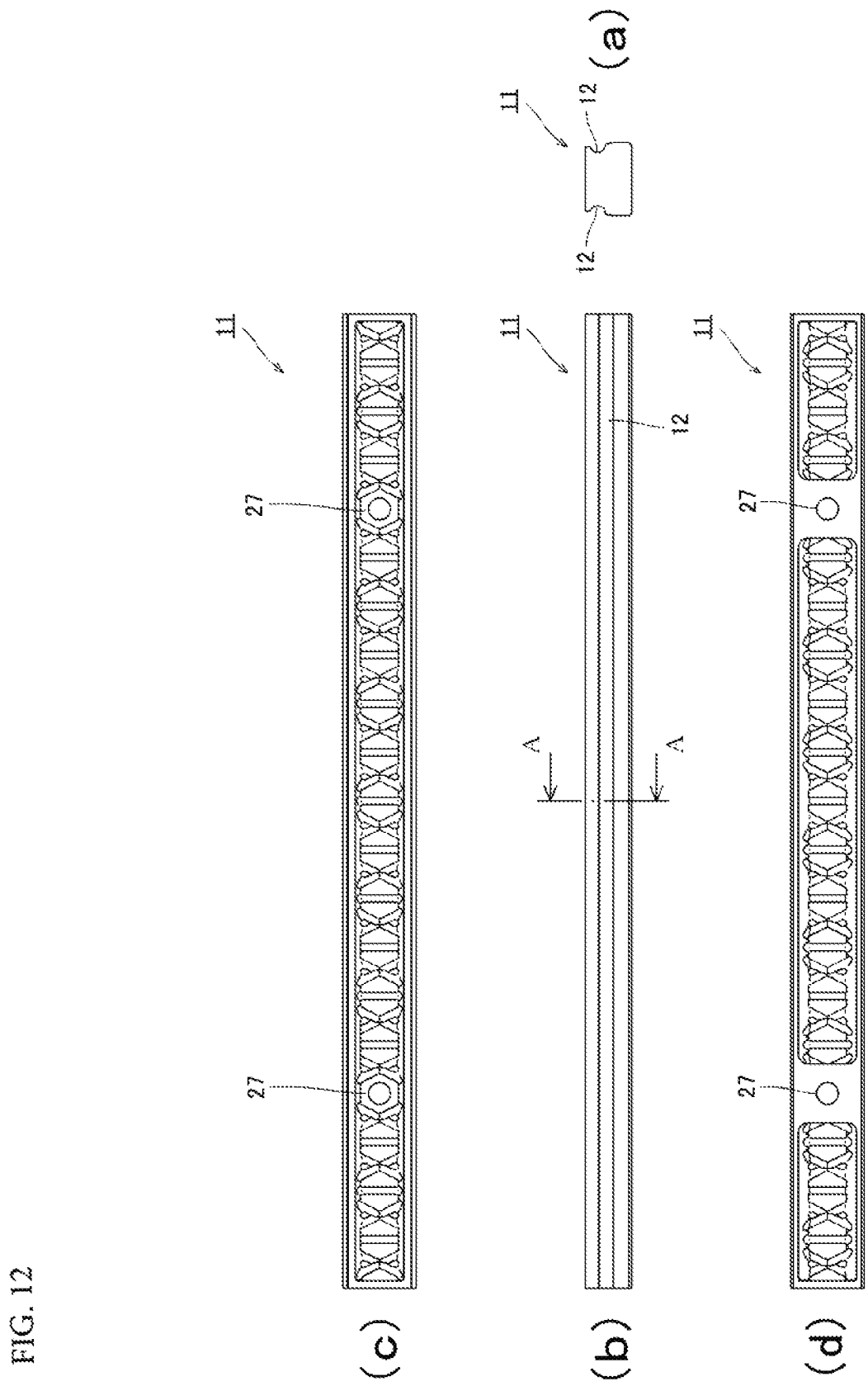
FIGS. 12(a) to 12(d) are diagrams illustrating an appearance of a track rail according to the example, where
Figure 13:
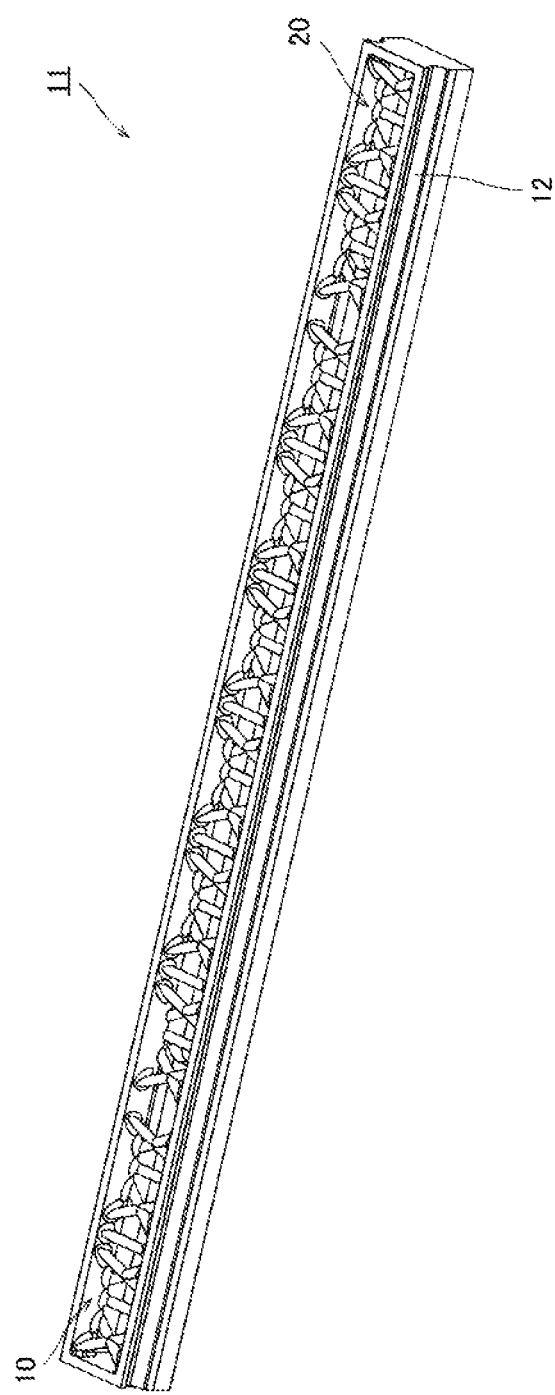
FIG. 13 is an external perspective view illustrating the track rail according to the example.
Figure 14:
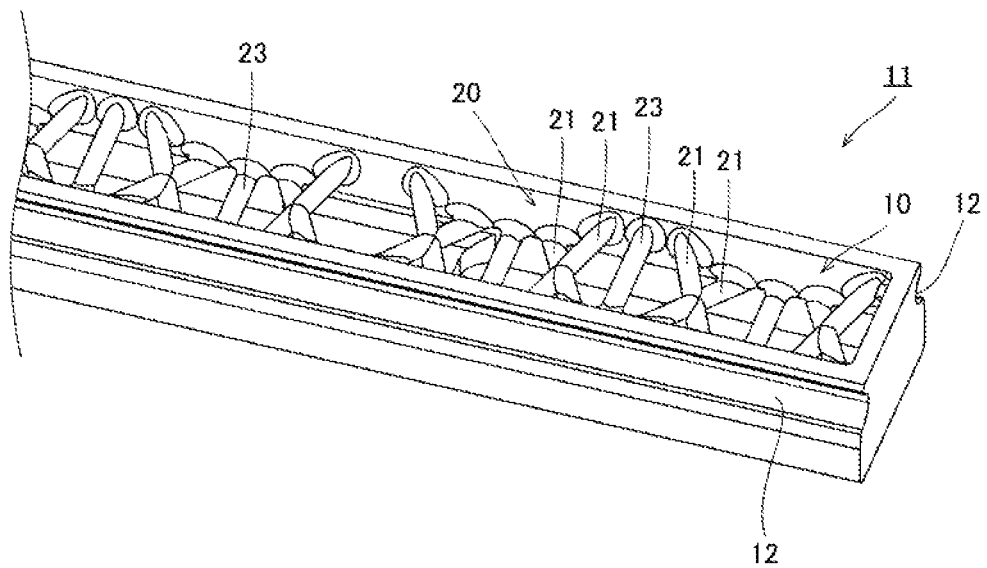
FIG. 14 is an enlarged perspective view illustrating a part of the track rail according to the example.
Figure 15:
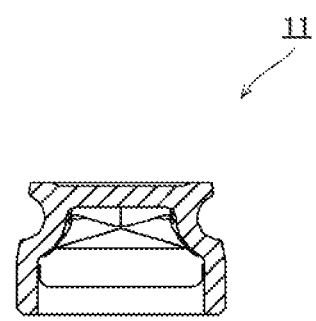
FIG. 15 is a cross-sectional view taken along a line A-A of FIG. 12(b).
Figure 16:
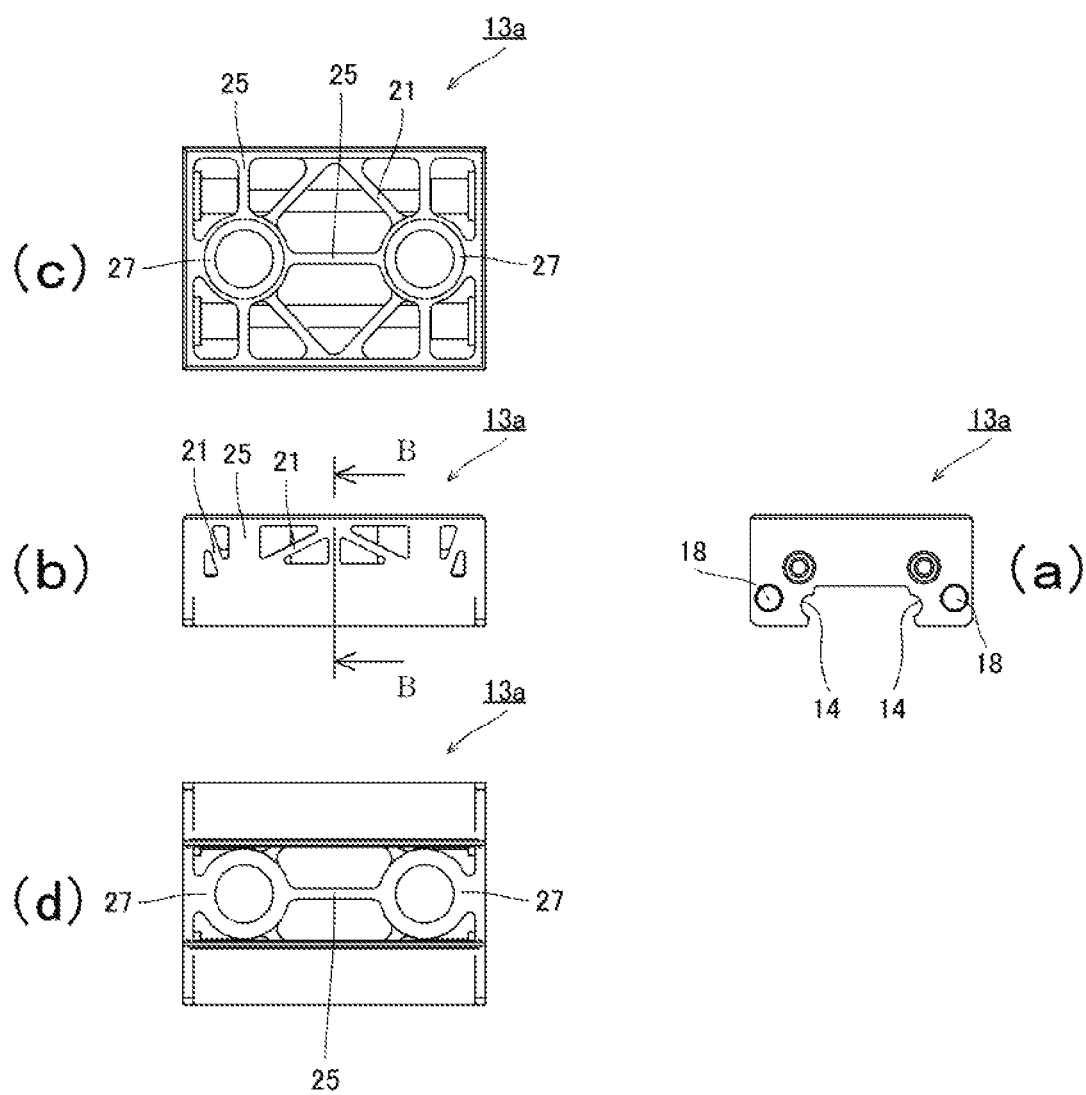
FIGS. 16(a) to 16(d) are diagrams illustrating an appearance of a movement block according to the example, where
Figure 17:
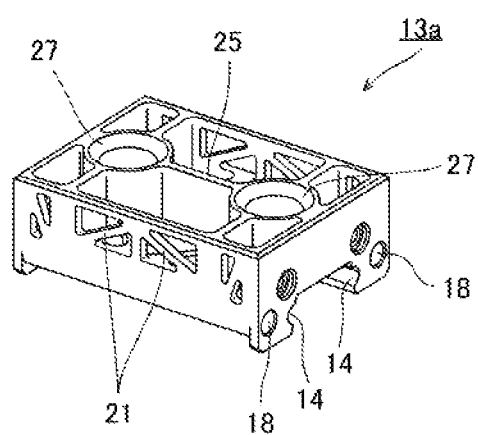
FIGS. 17(a) and 17(b) are perspective views illustrating the movement block according to the example, where
Figure 17:
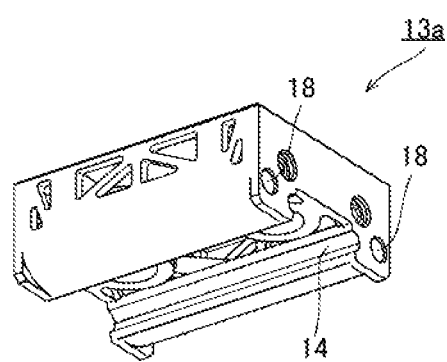
Figure 18:
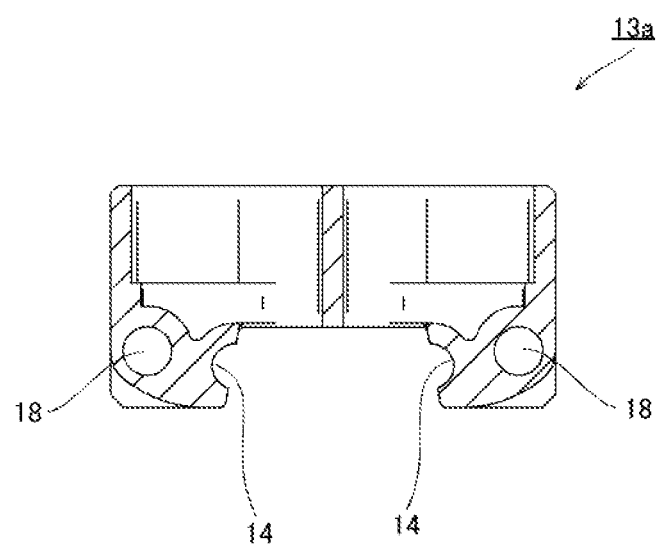
FIG. 18 is a cross-sectional view taken along a line B-B of FIG. 16(b).

As described above, a configuration example of the rolling device 300 according to the third embodiment has been described. Next, a detailed example having characteristics of the rolling device 100 according to the first embodiment will be described with reference to FIGS. 7 to 18. Here, FIG. 7 is an external front view illustrating a rolling device according to the example and FIG. 8 is an external side view illustrating the rolling device according to the example. FIG. 9 is an external top view illustrating the rolling device according to the example and FIG. 10 is an external perspective view illustrating the rolling device according to the example. FIG. 11 is an exploded diagram illustrating a state where the rolling device according to the example is disassembled. Further, FIGS. 12(a) to 12(d) are diagrams illustrating an appearance of a track rail according to the example, where FIG. 12(a) is an external front view illustrating the track rail according to the example, FIG. 12(b) is an external side view illustrating the track rail according to the example, FIG. 12(c) is an external top view illustrating the track rail according to the example, and FIG. 12(d) is an external bottom view illustrating the track rail according to the example. FIG. 13 is an external perspective view illustrating the track rail according to the example and FIG. 14 is an enlarged perspective view illustrating a part of the track rail according to the example. FIG. 15 is a cross-sectional view taken along a line A-A of FIG. 12(b). Further, FIGS. 16(a) to 16(d) are diagrams illustrating an appearance of a movement block according to the example, where FIG. 16(a) is an external front view, FIG. 16(b) is an external side view illustrating the movement block according to the example, FIG. 16(c) is an external top view illustrating the movement block according to the example, and FIG. 16(d) is an external bottom view illustrating the movement block according to the example. FIGS. 17(a) and 17(b) are perspective views illustrating the movement block according to the example, where FIG. 17(a) is a top perspective view illustrating the movement block according to the example and FIG. 17(b) is a bottom perspective view illustrating the movement block according to the example. FIG. 18 is a cross-sectional view taken along a line B-B of FIG. 16(b). Additionally, there is a case in which the same reference numerals are given to the same or similar components as or to those of the above-described embodiments and a description thereof is omitted.

EXAMPLE

First, an overall configuration example of a rolling device 400 according to the example will be described with reference to FIGS. 7 to 11. The rolling device 400 according to the example includes a track rail 11 which serves as an inner member having a raceway face formed on an outer face, a movement block 13 which serves as an outer member having a raceway face facing the raceway face of the inner member and is disposed at the outside of the inner member, and balls 15 which serve as rolling elements disposed between both raceway faces in a rollable manner.

The track rail 11 is an elongated member that has a substantially rectangular shape in a cross-section orthogonal to the longitudinal direction and the surface thereof is provided with a rolling element rolling face 12 which is formed in the entire length of the track rail 11 to serve as a raceway face on which the balls 15 roll. A pair of the rolling element rolling faces 12 according to the embodiment is provided at each of the left and right sides so that two rolling element rolling faces are provided in total. However, the number of the rolling element rolling faces can be changed arbitrarily in response to the application of the rolling device 400.

The movement block 13 includes a movement block body 13a as a constituting member of the movement block 13 and a pair of lid members 13b and 13b provided at both ends of the movement block body 13a in the movement direction. In the movement block body 13a, a load rolling element rolling face 14 which serves as a raceway face is formed at a position corresponding to the rolling element rolling face 12 of the track rail 11 and a non-load rolling element rolling path 18 is provided to extend in parallel while being separated from the load rolling element rolling face 14 by a predetermined gap so that the balls 15 serving as the rolling elements roll thereon in a non-load state. The lid member 13b is provided with a direction change path 19 which connects the load rolling element rolling path 17 and the non-load rolling element rolling path 18 to each other. Then, when the plurality of the balls 15 are installed on an endless circulation path formed by the load rolling element rolling path 17, the non-load rolling element rolling path 18, and the pair of direction change paths 19 and 19 to be circulated endlessly, the movement block 13 is relatively movable in a reciprocating manner with respect to the track rail 11.

As described above, a configuration example of the rolling device 400 according to the example has been described. Next, the structures of the track rail 11 and the movement block 13 which are characteristics of the example will be described in detail with reference to FIGS. 12(a) to 18.

The rolling device 400 according to the example has a configuration in which a space 10 is formed inside the track rail 11 and the movement block 13. For example, in the rolling device 400 according to the example, as illustrated in FIGS. 12(a) to 18, the space 10 is formed inside the track rail 11 and the movement block 13 excluding the endless circulation path formed by the load rolling element rolling path 17 which includes the rolling element rolling face 12 and the load rolling element rolling face 14 and on which the plurality of the balls 15 roll, the non-load rolling element rolling path 18, and the pair of direction change paths 19 and 19 which connect two rolling paths to each other, the lid member 13b and the attachment screw portion 27 used for the attachment of the track rail 11 or the movement block 13.

Additionally, the space according to the invention does not need to be a closed space inside the inner member or the outer member and may be a space which is opened to the outside as obvious from the space 10 of the example illustrated in FIGS. 12(a) to 18. That is, the space according to the invention is a space which is formed in at least one of the inner member and the outer member and may be any one of a closed space and an opened space.

Further, as illustrated in FIGS. 12(a) to 18, a spatial strength keeping mechanism 20 which keeps the strength of the inner member or the outer member is formed inside the space 10 formed in the track rail 11 and the movement block 13. In the rolling device 400 according to the example, the spatial strength keeping mechanism 20 is formed in a truss structure. Then, the spatial strength keeping mechanism 20 according to the example includes a diagonal member 21 which is disposed diagonally, a horizontal member 23 which is disposed horizontally, and a vertical member 25 which is disposed vertically.

That is, as illustrated in FIGS. 12(a) to 15, the spatial strength keeping mechanism 20 formed in the track rail 11 by the combination of two diagonal members 21 combined in an X-shape, a horizontal member 23 formed near a top face of the track rail 11, and a horizontal member 23 formed near a bottom face of the track rail 11. Then, a force caused by the load of the movement block 13 transmitted to the balls 15 serving as the rolling elements in a contact angle direction can be distributed by the diagonal members 21 and the horizontal members 23. Thus, in the track rail 11 according to the example, the track rail 11 can be decreased in weight and the strength of the track rail 11 can be kept.

As illustrated in FIGS. 16(a) to 18, the spatial strength keeping mechanism 20 formed in the movement block 13 is obtained by the combination of the diagonal members 21 and the vertical members 25 as in the structure of the spatial strength keeping mechanism 20 formed in the track rail 11. In the movement block 13 according to the example, the strength of the movement block 13 can be ensured while the weight of the movement block 13 is decreased.

From the description above, in the rolling device 400 according to the example, a remarkable decrease in weight can be realized while the function of the rolling device 400 is kept. Thus, the amount of a material forming the rolling device 400 can be decreased and thus the rolling device 400 can be manufactured at lower cost. Further, in the rolling device 400 according to the example, an increase in cost can be suppressed even when, for example, a titanium material which is an expensive material is used as a material forming the rolling device 400. Furthermore, the rolling device 400 according to the example which can be decreased in weight and be manufactured at low cost can be used in various fields of, for example, an airplane which needs to be decreased in weight or a consumer product which needs to be provided at low cost.

As described above, a configuration example of the rolling device 400 according to the example has been described. Next, a method for manufacturing a rolling device according to the embodiments and the example will be described.

[Method for Manufacturing Rolling Device]

The rolling devices 100, 200, 300, and 400 according to the embodiments and the example can be manufactured by a 3D (three-dimensional) printer. The 3D printer is, for example, a device that forms a shape of a three-dimensional structure by ejecting powder of synthetic resin or plaster from a nozzle to laminate the powder or irradiating UV light to light curable resin to cure the resin. According to the 3D printer, the three-dimensional structure can be shaped on the basis of 3D data.

The rolling devices 100, 200, 300, and 400 according to the embodiments and the example can be manufactured by the 3D printer, for example, in such a manner that a powdered material forming the rolling device is heated and melted and is ejected from a nozzle to be laminated or a powdered material forming the rolling device is sintered by a laser or the like. As the forming material, for example, a metal material can be used. When the rolling devices 100, 200, 300, and 400 according to the embodiments and the example are manufactured by the 3D printer, the rolling device having low weight can be manufactured further easily compared with the case where a cutting process is performed on the rolling device.

As described above, a method of manufacturing the rolling devices 100, 200, 300, and 400 according to the embodiments and the example has been described. Next, application examples of the rolling devices 100, 200, 300, and 400 according to the embodiments and the example will be described with reference to the drawings. Additionally, the embodiment of the rolling device to be exemplified below does not limit the invention according to claims. Further, it is difficult to mention that all combinations of characteristics described in the embodiment are essential for the solving means of the invention. Further, the "rolling device" of the specification includes, for example, all rolling and sliding devices including rolling bearings used in a machine tool, a non-lubrication bearing used in a vacuum state, a linear guide or a linear guide device, a ball spline device, a ball screw device, a roller screw device, across-roller ring, and the like.

[Other Application Examples of Rolling Device]

(Application Example to Rolling Element Screw Device)

Figure 19:
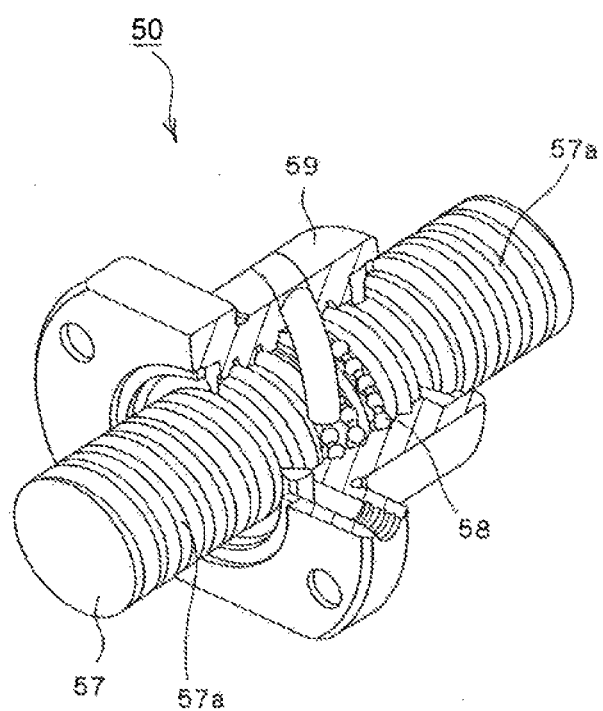
FIG. 19 is a diagram exemplifying a case where the rolling device according to the embodiment is configured as a ball screw device.

The rolling devices 100, 200, 300, and 400 according to the embodiments and the example can be configured as, for example, a ball screw device 50 illustrated in FIG. 19. FIG. 19 is a diagram exemplifying a case where the rolling device according to the embodiment is configured as a ball screw device. Such a ball screw device 50 is a device that includes a screw shaft 57 serving as an inner member and a nut member 59 serving as an outer member and attached to the screw shaft 57 through the plurality of the balls 58 to be relatively rotatable.

The screw shaft 57 is an inner member having a rolling element rolling groove 57a serving as a spiral raceway face formed on an outer peripheral face and the nut member 59 is an outer member having a load rolling groove serving as a spiral raceway face formed on an inner peripheral face to correspond to the rolling element rolling groove 57a. In accordance with the relative rotation of the screw shaft 57 with respect to the nut member 59, the nut member 59 is relatively movable in a reciprocating manner with respect to the screw shaft 57.

Then, the space 10 can be formed in the screw shaft 57, the nut member 59, the ball 58, and the other members constituting the ball screw device 50 and the spatial strength keeping mechanism 20, the external force absorbing mechanism 30, or the lubricant supply mechanism 40 can be formed therein. When the ball screw device 50 has the above-described configuration, for example, the ball screw device 50 having excellent performance and light weight and used in a wide field can be realized similarly to the above-described example.

(Application Example to Spline Device)

Figure 20:
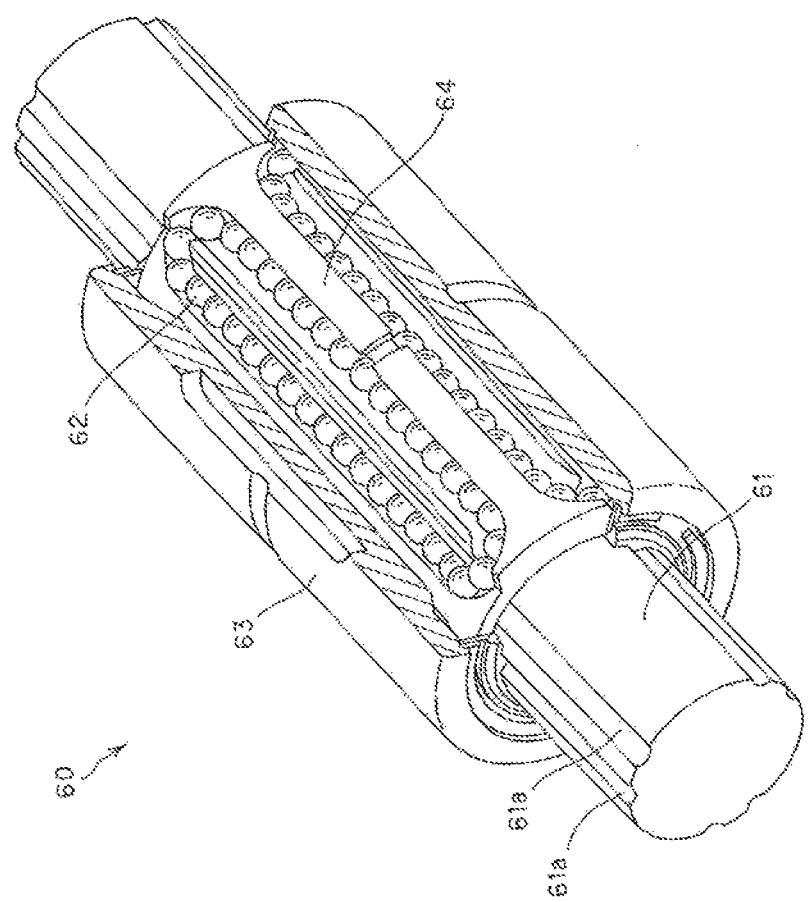
FIG. 20 is a diagram exemplifying a case where the rolling device according to the embodiment is configured as a spline device.

Further, the rolling devices 100, 200, 300, and 400 according to the embodiments and the example can be configured as, for example, a spline device 60 illustrated in FIG. 20. FIG. 20 is a diagram exemplifying a case where the rolling device according to the embodiment is configured as a spline device.

Here, a configuration of the spline device 60 illustrated in FIG. 20 will be simply described. The spline device 60 includes a spline shaft 61 which serves as an inner member and a cylindrical outer cylinder 63 which serves as an outer member attached to the spline shaft 61 through balls 62 serving as rolling elements in a movable manner. A surface of the spline shaft 61 is provided with a rolling element rolling face 61a which serves as a raceway face extending in the axis line direction of the spline shaft 61 so that the rolling element rolling face 61a becomes a track of the balls 62. The outer cylinder 63 attached to the spline shaft 61 is provided with a load rolling element rolling face which serves as a raceway face corresponding to the rolling element rolling face 61a. The load rolling element rolling face is provided with a plurality of protrusions (not illustrated) extending in the extension direction of the rolling element rolling face 61a. A load rolling path is formed between the load rolling element rolling face formed in the outer cylinder 63 and the rolling element rolling face 61a formed in the spline shaft 61. A non-load return path for the balls 62 released from a load is formed in the vicinity of the load rolling path. A retainer 64 which arranges and holds the plurality of the balls 62 in a circuit shape is assembled to the outer cylinder 63. Then, when the plurality of the balls 62 are installed between the load rolling element rolling face of the outer cylinder 63 and the rolling element rolling face 61a of the spline shaft 61 in a rollable manner and are installed to be circulated endlessly through the non-load return path, the outer cylinder 63 is relatively movable in a reciprocating manner with respect to the spline shaft 61.

Then, even in the case of the spline device 60 illustrated in FIG. 20, the space 10 can be formed in the spline shaft 61, the outer cylinder 63, the ball 62, and the other members constituting the spline device 60 and the spatial strength keeping mechanism 20, the external force absorbing mechanism 30, or the lubricant supply mechanism 40 can be formed therein. When the spline device 60 has the above-described configuration, for example, the spline device 60 having excellent performance and light weight and used in a wide field can be realized similarly to the above-described example.

(Application Example to Rotation Bearing Device)

Figure 21:
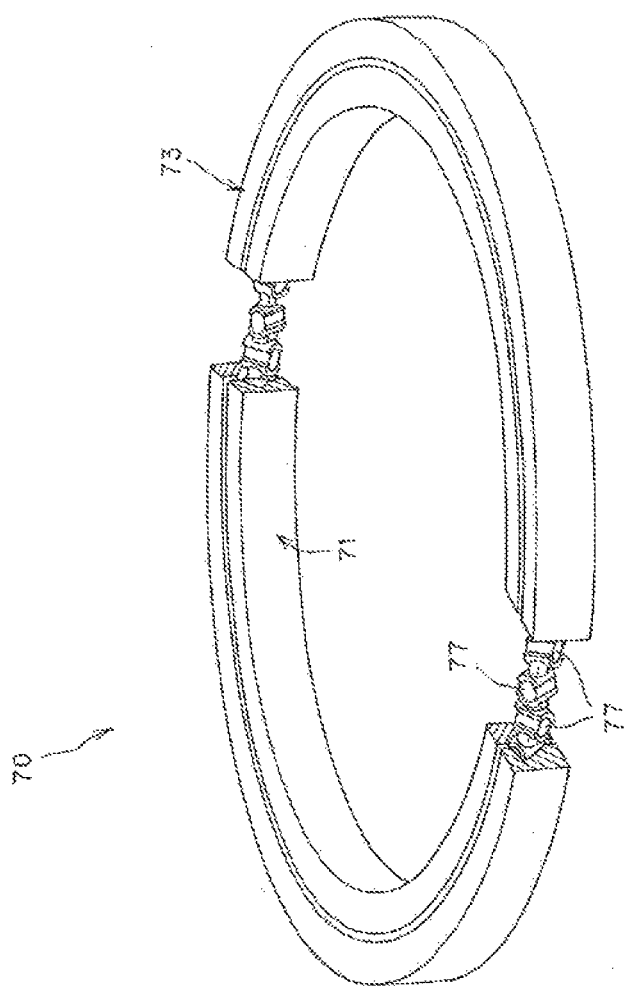
FIG. 21 is a partially longitudinal sectional perspective view exemplifying a case where the rolling device according to the embodiment is configured as a rotation bearing device.
Figure 22:
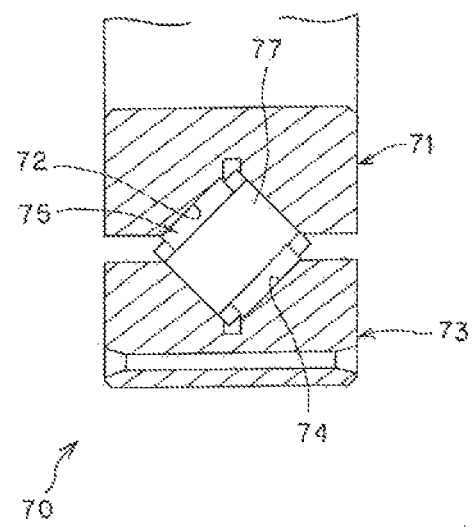
FIG. 22 is a longitudinal sectional view illustrating the rotation bearing device of FIG. 21.

Further, the rolling devices 100, 200, 300, and 400 according to the embodiments and the example can be configured as, for example, a rotation bearing device 70 illustrated in FIGS. 21 and 22. Here, FIG. 21 is a partially longitudinal sectional perspective view exemplifying a case where the rolling device according to the embodiment is configured as a rotation bearing device. Further, FIG. 22 is a longitudinal sectional view illustrating the rotation bearing device of FIG. 21.

As illustrated in FIGS. 21 and 22, the rolling device configured as the rotation bearing device 70 includes an inner race 71 which serves as an inner member having an inner raceway face 72 with a V-shaped cross-section in an outer peripheral face, an outer race 73 which serves as an outer member or an inner member having an outer raceway face 74 with a V-shaped cross-section in an inner peripheral face, and rollers 77 which serve as a plurality of rolling elements disposed in a cross pattern in a track 75 having a substantially rectangular cross-section and formed by the inner raceway face 72 and the outer raceway face 74. Accordingly, the inner race 71 and the outer race 73 relatively rotate in the circumferential direction.

When the space 10 is formed in a member constituting the rotation bearing device 70 and the spatial strength keeping mechanism 20, the external force absorbing mechanism 30, and the lubricant supply mechanism 40 are formed therein, for example, the rotation bearing device 70 having excellent performance and lightweight and used in a wide field can be realized similarly to the above-described example.

(Application Examples to Sliding Screw Device)

In the above-described devices, a device has been exemplified in which the plurality of rolling elements are interposed between the inner member and the outer member. However, the application example of the invention characterized in that the space 10 is formed inside at least one of the inner member and the outer member and the spatial strength keeping mechanism 20, the external force absorbing mechanism 30, or the lubricant supply mechanism 40 is formed therein is not limited to the application example using such a rolling element. The invention can be appropriately used in a device in which the inner member and the outer member are relatively movable while directly contacting each other without the rolling element.

Figure 23:
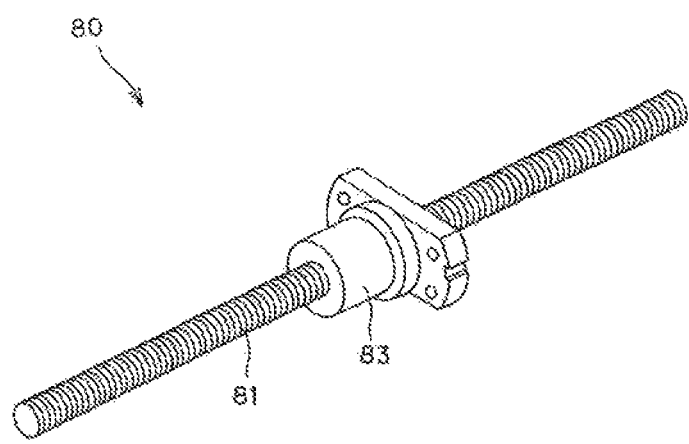
FIG. 23 is an external perspective view illustrating a case where the rolling device according to the embodiment is configured as a sliding screw device.

For example, as illustrated in FIG. 23, the invention can be also applied the rolling device configured as the sliding screw device 80. Here, FIG. 23 is an external perspective view illustrating a case where the rolling device according to the embodiment is configured as a sliding screw device. Then, the sliding screw device 80 illustrated in FIG. 23 includes a screw shaft 81 which serves as an inner member provided with a screw groove serving as a spiral raceway face on an outer peripheral face and a nut member 83 which serves as an outer member provided with a nut groove serving as a spiral raceway face corresponding to the screw groove on an inner peripheral face. Accordingly, the nut member 83 is relatively movable with respect to the screw shaft 81 in accordance with the relative rotation of the screw shaft 81 with respect to the nut member 83.

Further, even in the sliding screw device 80 illustrated in FIG. 23, the space 10 can be formed in one of or both the screw shaft 81 and the nut member 83 serving as constituting members and the spatial strength keeping mechanism 20, the external force absorbing mechanism 30, and the lubricant supply mechanism 40 can be formed therein. When the space 10 is formed in a member constituting the sliding screw device 80 and the spatial strength keeping mechanism 20, the external force absorbing mechanism 30, and the lubricant supply mechanism 40 are formed therein, for example, the sliding screw device 80 having excellent performance and light weight and used in a wide field can be realized similarly to the above-described example.

While the embodiments and the example of the invention have been described, the technical scope of the invention is not limited to the scope of the embodiments. Various modifications or improvements of the embodiments and the examples can be made.

Figure 24:
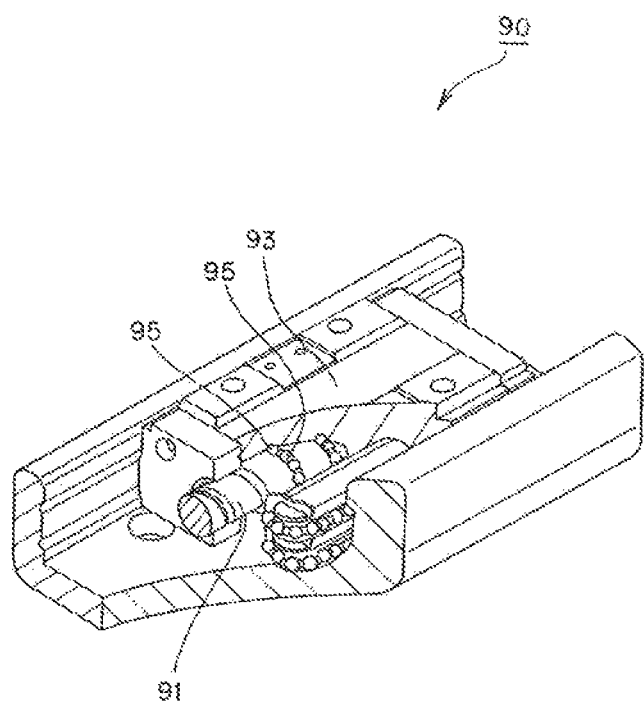
FIG. 24 is a diagram illustrating various application examples of the invention and is a partially external cross-sectional view illustrating a rolling device obtained by integrating a linear motion guide and a ball screw with each other.

For example, the invention can be also applied to a rolling device 90 which is obtained by integrating a linear motion guide and a ball screw as illustrated in FIG. 24. Additionally, in the case of the rolling device 90 illustrated in FIG. 24, the screw shaft 91 and the movement block 93 are connected to each other through the plurality of the balls 95, but the screw shaft 91 and the movement block 93 can be configured as a sliding screw without using the plurality of the balls 95.

Further, for example, if desired strength can be obtained even when the space 10 is formed in the rolling device, the spatial strength keeping mechanism 20 may not be formed.

Furthermore, for example, in the above-described embodiments, any one of the spatial strength keeping mechanism 20, the external force absorbing mechanism 30, and the lubricant supply mechanism 40 is provided, but a combination of the spatial strength keeping mechanism 20, the external force absorbing mechanism 30, and the lubricant supply mechanism 40 can be used.

Further, for example, in the above-described embodiment, the space 10 is formed inside the track rail 11 or the movement block 13. However, the space 10 can be formed inside the ball 15 and the spatial strength keeping mechanism 20, the external force absorbing mechanism 30, or the lubricant supply mechanism 40 can be formed therein.

Further, in the above-described embodiment, the lubricant supply mechanism 40 is formed inside the movement block 13, but the lubricant supply mechanism 40 can be formed inside the track rail 11. With such a configuration, the lubricant can be supplied to the rolling element rolling face 12 serving as the raceway face or the balls 15 serving as the rolling elements.

Further, an example has been described in which a 3D printer is used in the method for manufacturing a rolling device according to the embodiment and the example, but the scope of the method of the invention is not limited to the manufacturing method using the 3D printer. For example, any manufacturing method can be used as long as the structure of the rolling device according to the above-described embodiments and the example can be realized.

It is obvious that the modifications or improvements are also included in the technical scope of the invention from the description of claims.

REFERENCE NUMERALS 100, 200, 300, 400: Rolling device, 10: Space, 11: Track rail, 11a: Concave portion, 11b: Convex portion, 12: Rolling element rolling face, 13: Movement block, 13a: Movement block body, 13b: Lid member, 14: Load rolling element rolling face, 15: Ball, 17: Load rolling element rolling path, 18: Non-load rolling element rolling path, 19: Direction change path, 20: Spatial strength keeping mechanism, 21: Diagonal member, 23: Horizontal member, 25: Vertical member, 27: Attachment screw portion, 30: External force absorbing mechanism, 40: Lubricant supply mechanism, 41: Lubricant storage space, 42: Lubricant replenishing hole, 42a: Stopper, 43: (Small-diameter) hole, 45: Lubricant containing body, 50: Ball screw device, 57: Screw shaft, 57a: Rolling element rolling groove, 58: Ball, 59: Nut member, 60: Spline device, 61: Spline shaft, 61a: Rolling element rolling face, 62: Ball, 63: Outer cylinder, 64: Retainer, 70: Rotation bearing device, 71: Inner race, 72: Inner raceway face, 73: Outer race, 74: Outer raceway face, 75: Track, 77: Roller, 80: Sliding screw device, 81: Screw shaft, 83: Nut member, 90: Rolling device, 91: Screw shaft, 93: Movement block, 95: Ball

The invention claimed is:

1. A rolling device comprising:
an inner member that has a raceway face formed on an outer face;

an outer member that has a raceway face facing the raceway face of the inner member and is disposed at an outside of the inner member; and rolling elements that are disposed between both raceway faces in a rollable manner, wherein the inner member has a space formed therein, wherein a spatial strength keeping mechanism is provided inside the space, which the spatial strength keeping mechanism keeps strength of the inner member, wherein the spatial strength keeping mechanism is configured by any one of, or by a combination of a diagonal member which is disposed diagonally, a plurality of horizontal members which are disposed horizontally, or a vertical member which is disposed vertically, with respect to a horizontal plane of the inner member when the inner member has been disposed in said horizontal plane, wherein the horizontal plane is parallel to a top surface of the inner member, wherein the spatial strength keeping mechanism does not extend beyond a vertical area covered by a rolling element rolling face of the inner member, and wherein the inner member has been manufactured as an integrated member by a 3D printer.

2. The rolling device according to claim 1, wherein the spatial strength keeping member provided in the inner member is configured by combining two of the diagonal members combined in an X shape, one of the plurality of horizontal members formed toward an upper surface side of the inner member, and another one of the horizontal members formed toward a bottom surface side of the inner member.

3. A method for manufacturing a rolling device by a 3D printer, the rolling device including:

an inner member that has a raceway face formed on an outer face;

an outer member that has a raceway face facing the raceway face of the inner member and is disposed at an outside of the inner member;

rolling elements that are disposed between both raceway faces in a rollable manner; and a space formed on an inside of the inner member, wherein a spatial strength keeping mechanism is provided inside the space, which the spatial strength keeping mechanism keeps strength of the inner member, wherein the spatial strength keeping mechanism is configured by any one of, or by a combination of a diagonal member which is disposed diagonally, a plurality of horizontal members which are disposed horizontally, or a vertical member which is disposed vertically, with respect to a horizontal plane of the inner member when the inner member has been disposed in said horizontal plane, wherein the horizontal plane is parallel to a top surface of the inner member, wherein the spatial strength keeping mechanism does not extend beyond a vertical area covered by a rolling element rolling face of the inner member, and the method comprising manufacturing the inner member, as an integrated member, by the 3D printer.

* * * * *